(12) United States Patent
Hayashi

(10) Patent No.: US 12,024,856 B2
(45) Date of Patent: Jul. 2, 2024

(54) WORK MACHINE

(71) Applicant: KOMATSU LTD., Tokyo (JP)

(72) Inventor: Keiichi Hayashi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 25 days.

(21) Appl. No.: 17/629,819

(22) PCT Filed: Sep. 10, 2020

(86) PCT No.: PCT/JP2020/034257
§ 371 (c)(1),
(2) Date: Jan. 25, 2022

(87) PCT Pub. No.: WO2021/065404
PCT Pub. Date: Apr. 8, 2021

(65) Prior Publication Data
US 2022/0259817 A1 Aug. 18, 2022

(30) Foreign Application Priority Data

Sep. 30, 2019 (JP) .................................. 2019-180941

(51) Int. Cl.
*B60G 17/005* (2006.01)
*B60G 21/00* (2006.01)
*E02F 9/02* (2006.01)

(52) U.S. Cl.
CPC ............ *E02F 9/028* (2013.01); *B60G 17/005* (2013.01); *B60G 21/007* (2013.01);
(Continued)

(58) Field of Classification Search
CPC ....... E02F 9/028; E02F 3/3411; E02F 9/2087; E02F 9/0841; E02F 9/2296; E02F 2/265;
(Continued)

(56) References Cited

U.S. PATENT DOCUMENTS 4,512,589 A 4/1985 Ambrose et al.
5,947,516 A 9/1999 Ishikawa
(Continued)

FOREIGN PATENT DOCUMENTS

CN 108216364 B * 5/2002 ............ B60W 30/09
CN 202174906 U 3/2012
(Continued)

OTHER PUBLICATIONS

Description Translation for EP 2,444,304 from Espacenet (Year: 2012).*

*Primary Examiner* — Jason D Shanske
*Assistant Examiner* — Daniel M. Keck
(74) *Attorney, Agent, or Firm* — Faegre Drinker Biddle & Reath LLP

(57) ABSTRACT

Tipping over of a work machine is prevented. The work machine includes: a vehicular body; a rear axle attached to the vehicular body to be capable of undergoing a roll motion with respect to an axis extending in a front-rear direction of the vehicular body; and a controller. The controller acquires stability of the center of gravity of the vehicular body, and controls the roll motion of the rear axle with respect to the vehicular body based on the stability.

9 Claims, 9 Drawing Sheets

(52) U.S. Cl.
CPC .. *B60G 2300/09* (2013.01); *B60G 2400/0511* (2013.01); *B60G 2400/0516* (2013.01); *B60G 2400/63* (2013.01)

(58) Field of Classification Search
CPC ... E02F 9/08; E02F 3/342; E02F 3/422; E02F 9/02; E02F 9/10; E02F 9/20; E02F 9/2058; B60G 17/005; B60G 21/007; B60G 2300/09; B60G 2400/0511; B60G 2400/0516; B60G 2400/63; B60G 2204/46; B60G 2400/95; B60G 2800/0124; B60G 9/02; B60G 17/016; B60K 17/30; B60K 17/344
See application file for complete search history.

(56) References Cited

U.S. PATENT DOCUMENTS

| | | | | |
|---|---|---|---|---|
| 11,879,231 | B2 * | 1/2024 | Kean | E02F 3/434 |
| 2002/0075157 | A1 | 6/2002 | Muller | |
| 2004/0154844 | A1 * | 8/2004 | Lovato | B60G 9/02 180/41 |
| 2006/0232025 | A1 | 10/2006 | Braud | |
| 2020/0141088 | A1 * | 5/2020 | Myers | E02F 3/431 |
| 2023/0340758 | A1 * | 10/2023 | Wuisan | E02F 9/0858 |

FOREIGN PATENT DOCUMENTS

| | | | | |
|---|---|---|---|---|
| CN | 103303091 | A | 9/2013 | |
| CN | 103895467 | A | 7/2014 | |
| DE | 10017358 | A1 | 10/2001 | |
| EP | 2444304 | A1 * | 4/2012 | B60G 17/016 |
| FR | 672110 | A | 12/1929 | |
| JP | S58-183307 | A | 10/1983 | |
| JP | H03-73597 | U | 7/1991 | |
| JP | H05-086636 | A | 4/1993 | |
| JP | H07-242398 | A | 9/1995 | |
| JP | H11-035298 | A | 2/1999 | |
| JP | 2002-067649 | A | 3/2002 | |
| JP | 2002-67781 | A | 3/2002 | |
| JP | 2002-242233 | A | 8/2002 | |
| JP | 2006-298048 | A | 11/2006 | |
| JP | 2007-186953 | A | 7/2007 | |
| JP | 2008-101345 | A | 5/2008 | |
| WO | WO-2007037107 | A1 * | 4/2007 | B60G 17/005 |
| WO | WO-2019086133 | A1 * | 5/2019 | |

* cited by examiner

WORK MACHINE

TECHNICAL FIELD

The present disclosure relates to a work machine.

BACKGROUND ART

Japanese Patent Laying-Open No. 05-86636 (PTL 1) discloses a work vehicle in which the posture of a work implement is adjusted when the rotation moment in the direction in which a vehicle contacts the ground becomes equal to or less than a threshold value. This rotation moment is obtained by combining the rotation moment of a vehicular body and the rotation moment of the work implement. This literature discloses that such a configuration prevents the work vehicle from tipping over when it travels on an inclined terrain.

CITATION LIST

Patent Literature

PTL 1: Japanese Patent Laying-Open No. 5-86636

SUMMARY OF INVENTION

Technical Problem

A work machine such as a wheel loader includes a rear axle oscillation mechanism that causes rear wheels to be inclined leftward and rightward along unevenness of the ground, to thereby allow four wheels including front and rear wheels to continuously contact the ground so as to reliably transmit the driving force to the ground.

The above-mentioned literature discloses a work vehicle including a rear axle that does not rotate with respect to its vehicular body, and fails to consider prevention of tipping over of a work machine that can oscillate.

The present disclosure provides a technique that can prevent tipping over of a work machine including a rear axle capable of undergoing a roll motion with respect to a vehicular body.

Solution to Problem

According to the present disclosure, a work machine is provided that includes: a vehicular body; and a rear axle attached to the vehicular body to be capable of undergoing a roll motion with respect to an axis extending in a front-rear direction of the vehicular body. The work machine includes a controller. The controller acquires stability of a center of gravity of the vehicular body and controls the roll motion of the rear axle with respect to the vehicular body based on the stability of the center of gravity.

Advantageous Effects of Invention

According to the present disclosure, tipping over of a work machine including a rear axle capable of undergoing a roll motion with respect to a vehicular body can be prevented.

DESCRIPTION OF EMBODIMENTS

Figure 1:
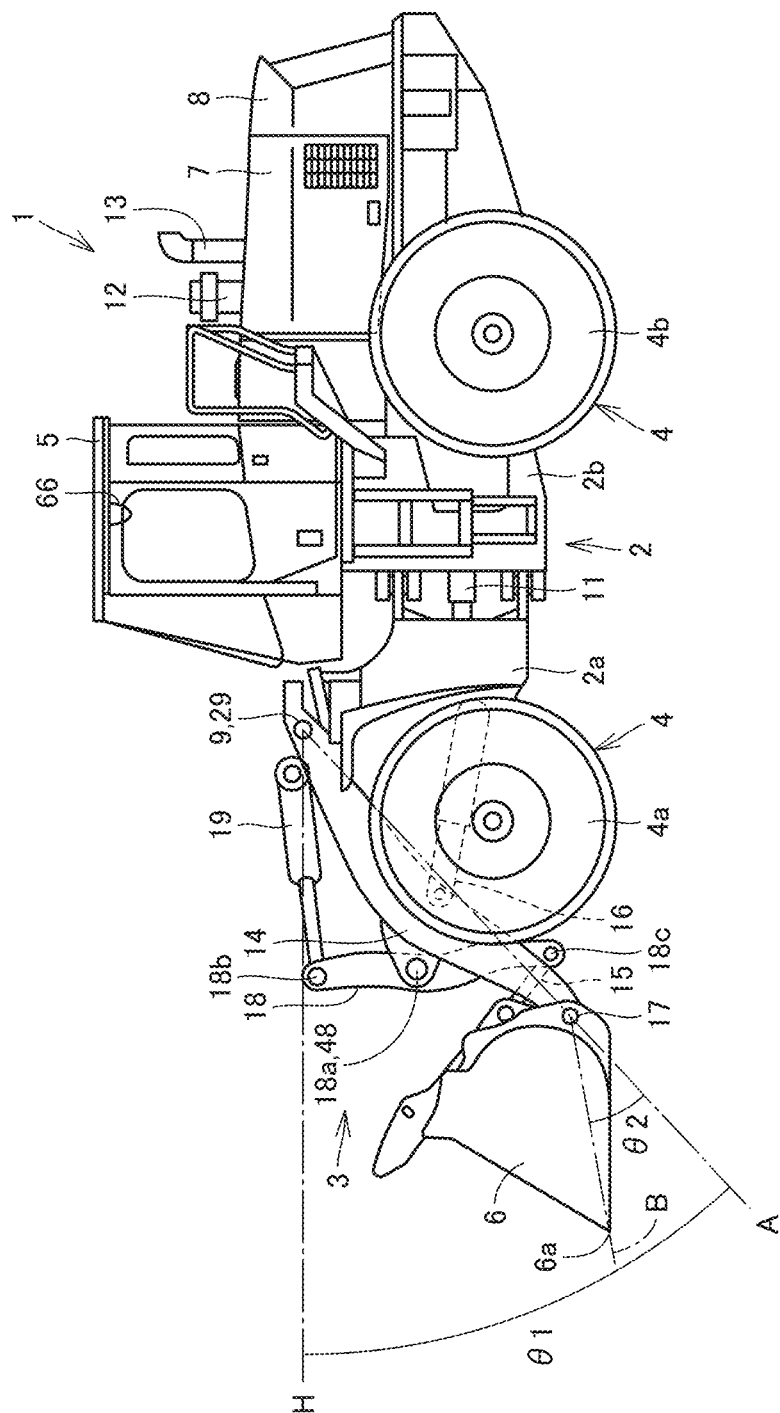
FIG. 1 is a side view of a wheel loader as an example of a work machine according to an embodiment.

Embodiments will be hereinafter described with reference to the accompanying drawings. In the following description, the same components are denoted by the same reference characters. Names and functions thereof are also the same. Accordingly, the detailed description thereof will not be repeated.

<Overall Configuration>

In an embodiment, a wheel loader 1 will be described as an example of a work machine. FIG. 1 is a side view of wheel loader 1 as an example of the work machine according to the embodiment.

As shown in FIG. 1, wheel loader 1 includes a vehicular body frame 2, a work implement 3, a traveling unit 4, and a cab 5. Vehicular body frame 2, cab 5 and the like constitute a vehicular body (a work machine main body) of wheel loader 1. Work implement 3 and traveling unit 4 are attached to the vehicular body of wheel loader 1.

Traveling unit 4 cause the vehicular body of wheel loader 1 to travel and includes running wheels 4a and 4b. Wheel loader 1 is movable as running wheels 4a and 4b are rotationally driven, and also, can perform a desired work using work implement 3.

Vehicular body frame 2 includes a front frame 2a and a rear frame 2b. Front frame 2a and rear frame 2b are attached to each other so as to be pivotable in a left-right direction. A pair of steering cylinders 11 is attached across front frame 2a and rear frame 2b. Each steering cylinder 11 is a hydraulic cylinder. As each steering cylinder 11 extends and contracts by hydraulic oil from a steering pump (not shown), the traveling direction of wheel loader 1 is laterally changed.

In the present specification, the direction in which wheel loader 1 travels straightforward is referred to as a front-rear direction of wheel loader 1. In the front-rear direction of wheel loader 1, the side where work implement 3 is located with respect to vehicular body frame 2 is referred to as a frontward direction, and the side opposite to the frontward direction is referred to as a rearward direction. The left-right direction of wheel loader 1 is orthogonal to the front-rear direction in a plan view of wheel loader 1 situated on a flat ground. The right side and the left side in the left-right direction in facing forward are defined as a right direction and a left direction, respectively. A top-bottom direction of wheel loader 1 is orthogonal to a plane defined by the front-rear direction and the left-right direction. In the top-bottom direction, the ground side is defined as a lower side and the sky side is defined as an upper side.

Work implement 3 and a pair of left and right running wheels (front wheels) 4a are attached to front frame 2a. Work implement 3 is disposed on the front side of the vehicular body. Work implement 3 is driven by hydraulic oil from a work implement pump 25 (see FIG. 2). Work implement pump 25 is a hydraulic pump that is driven by an engine 20 to discharge hydraulic oil for operating work implement 3. Work implement 3 includes a boom 14 and a bucket 6 that serves as a work tool. Bucket 6 is disposed at the distal end of work implement 3. Bucket 6 is an example of an attachment detachably attached to the distal end of boom 14. Depending on the type of work, the attachment is replaced with a grapple, a fork, a plow, or the like.

A proximal end portion of boom 14 is attached by a boom pin 9 to front frame 2a so as to be rotatable. By a bucket pin 17 located at a distal end of boom 14, bucket 6 is attached to boom 14 so as to be rotatable.

Front frame 2a and boom 14 are coupled to each other by a pair of boom cylinders 16. Each boom cylinder 16 is a hydraulic cylinder. Each boom cylinder 16 has a proximal end attached to front frame 2a and a distal end attached to boom 14. As boom cylinder 16 extends and contracts by hydraulic oil from work implement pump 25 (see FIG. 2), boom 14 is raised and lowered. Boom cylinder 16 rotationally drives boom 14 to be raised and lowered about boom pin 9.

Work implement 3 further includes a bell crank 18, a bucket cylinder 19, and a link 15. By a support pin 18a located substantially in the center of boom 14, bell crank 18 is supported on boom 14 so as to be rotatable. Bucket cylinder 19 couples bell crank 18 to front frame 2a. Link 15 is coupled to a coupling pin 18c provided at a distal end portion of bell crank 18. Link 15 couples bell crank 18 and bucket 6.

Bucket cylinder 19 is a hydraulic cylinder and serves as a work tool cylinder. Bucket cylinder 19 has a proximal end attached to front frame 2a. Bucket cylinder 19 has a distal end attached to a coupling pin 18b provided at a proximal end portion of bell crank 18. When bucket cylinder 19 extends and contracts by hydraulic oil from work implement pump 25 (see FIG. 2), bucket 6 pivots up and down. Bucket cylinder 19 drives bucket 6 to rotate about bucket pin 17.

Cab 5 and a pair of left and right running wheels (rear wheels) 4b are attached to rear frame 2b. Cab 5 is disposed behind boom 14. Cab 5 is placed on vehicular body frame 2. A seat on which an operator sits, an operation apparatus (described later), and the like are disposed inside cab 5.

Inside cab 5, an inertial measurement unit (IMU) 66 is disposed. IMU 66 detects the inclination of vehicular body frame 2. IMU 66 detects inclination angles of vehicular body frame 2 with respect to the front-rear direction and the left-right direction. IMU 66 detects the inclination of the vehicular body of wheel loader 1 with respect to the vertical direction.

An engine hood 7 is disposed behind cab 5. Engine hood 7 covers the upper side and both sides of the accommodation space in which engine 20 (FIG. 2) and the like are accommodated. An air cleaner 12 and an exhaust pipe 13 protrude upward from the upper surface of engine hood 7.

A rear face grille 8 is disposed behind engine hood 7. Rear face grille 8 covers the accommodation space from behind. The rear surface of rear face grille 8 is provided with an intake port that allows communication between the inside and the outside of the accommodation space. Through this intake port, air is supplied into the accommodation space.

Figure 2:
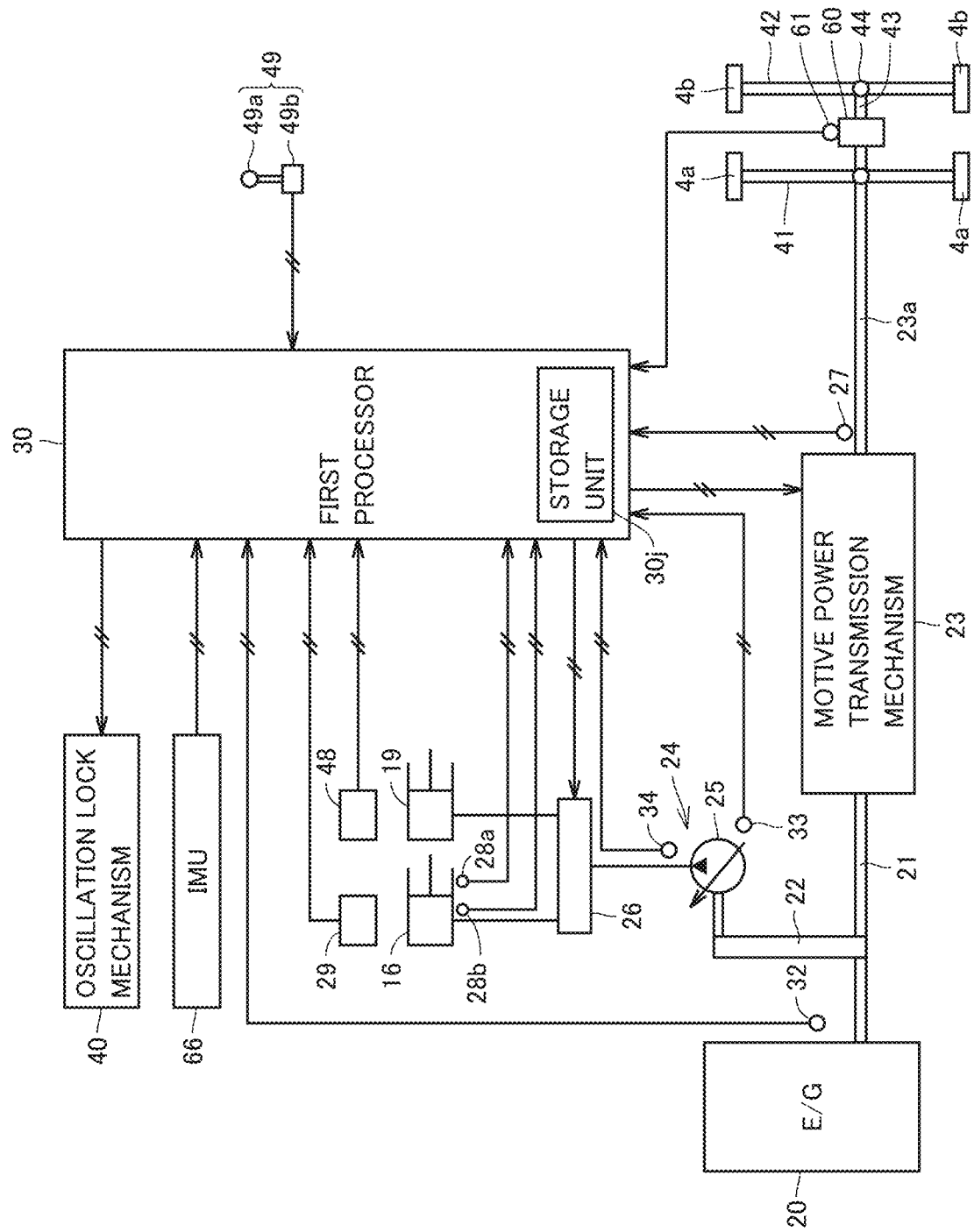
FIG. 2 is a schematic block diagram showing a configuration of the entire system including the wheel loader according to an embodiment.

FIG. 2 is a schematic block diagram showing a configuration of the entire system including wheel loader 1 according to an embodiment.

Wheel loader 1 includes engine 20, a motive power extraction unit 22, a motive power transmission mechanism 23, a cylinder driving unit 24, a first angle detector 29, a second angle detector 48, a pivot mechanism 60, and a first processor 30 (a controller).

Engine 20 is a diesel engine, for example. Engine 20 is accommodated in the accommodation space covered by engine hood 7 (FIG. 1). An output from engine 20 is controlled by adjusting the amount of fuel to be injected into a cylinder of engine 20. Engine 20 is provided with a rotation sensor 32. Rotation sensor 32 detects the rotation speed of the rotation shaft inside engine 20 and outputs a detection signal indicating the rotation speed to first processor 30.

Motive power extraction unit 22 is an apparatus that distributes the output from engine 20 to motive power transmission mechanism 23 and cylinder driving unit 24. Motive power transmission mechanism 23 is a mechanism that transmits the driving force from engine 20 to a front wheel 4a and a rear wheel 4b, and serves as a transmission, for example. In wheel loader 1, both front wheels 4a attached to front frame 2a and rear wheels 4b attached to rear frame 2b constitute driving wheels that receive driving force to cause wheel loader 1 to travel.

Motive power transmission mechanism 23 changes the speed of rotation of an input shaft 21 and outputs the resultant rotation to an output shaft 23a. A vehicle speed detection unit 27 for detecting a vehicle speed of wheel loader 1 is attached to output shaft 23a of motive power transmission mechanism 23. Wheel loader 1 includes vehicle speed detection unit 27.

Vehicle speed detection unit 27 is a vehicle speed sensor, for example. Vehicle speed detection unit 27 detects the rotation speed of output shaft 23a to thereby detect the speed of movement of wheel loader 1 by traveling unit 4 (FIG. 1). Vehicle speed detection unit 27 functions as a rotation sensor for detecting the rotation speed of output shaft 23a. Vehicle speed detection unit 27 functions as a movement detector that detects the movement by traveling unit 4. Vehicle speed detection unit 27 outputs a detection signal showing the vehicle speed of wheel loader 1 to first processor 30.

A front axle 41 is connected to output shaft 23a. The driving force generated by engine 20 is transmitted to front axle 41. Left and right front wheels 4a are attached to respective both ends of front axle 41. The driving force is transmitted from front axle 41 to the pair of left and right front wheels 4a. Front axle 41 is supported by front frame 2a. Each front wheel 4a is attached via front axle 41 to front frame 2a, which forms a part of the vehicular body of wheel loader 1, such that each front wheel 4a is rotatable with respect to front frame 2a.

Pivot mechanism 60 couples front frame 2a and rear frame 2b to each other so as to be pivotable. Front frame 2a is pivoted with respect to rear frame 2b by extension and contraction of an articulation cylinder coupled between front frame 2a and rear frame 2b. Front frame 2a can be angled with respect to rear frame 2b. By angling (articulating) front frame 2a with respect to rear frame 2b, the turning radius difference between front wheel 4a and rear wheel 4b can be reduced to thereby reduce a radius of revolution in revolution of wheel loader 1.

Pivot mechanism 60 is provided with an articulation angle sensor 61. Articulation angle sensor 61 detects an articulation angle that is formed by front frame 2a and rear frame 2b. Articulation angle sensor 61 outputs a detection signal indicating the articulation angle to first processor 30.

A rear propeller shaft 43 is connected to output shaft 23a. Rear propeller shaft 43 has a rear end provided with a coupling portion 44. A rear axle 42 is connected to coupling portion 44. Rear axle 42 is connected to output shaft 23a via rear propeller shaft 43. The driving force generated by engine 20 is transmitted to rear axle 42. Left and right rear wheels 4b are attached to respective both ends of rear axle 42. Driving force is transmitted from rear axle 42 to the pair of left and right rear wheels 4b. Rear axle 42 is supported by rear frame 2b. Each rear wheel 4b is attached via rear axle 42 to rear frame 2b, which forms a part of the vehicular body of wheel loader 1, such that each rear wheel 4b is rotatable with respect to rear frame 2b.

FIG. 2 schematically shows an example of a structure for transmitting driving force generated by engine 20 to front wheel 4a and rear wheel 4b. The structure for transmitting motive power from engine 20 to front wheel 4a and rear wheel 4b is not limited to the above-described example. For example, motive power transmission mechanism 23 may include a transmission and a transfer for distributing the driving force to the front and rear shafts, and may be configured to transmit driving force from one end of the output shaft of the transfer to front wheel 4a and to transmit driving force from the other end of the output shaft of the transfer to rear wheel 4b.

Figure 3:
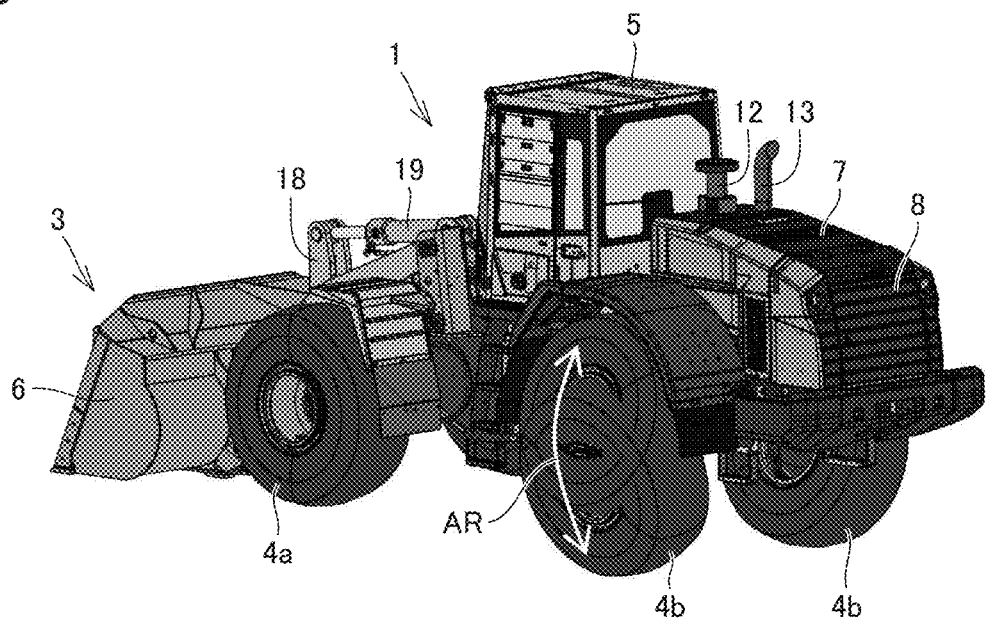
FIG. 3 is a perspective view showing rear wheels in an oscillatable state.
Figure 4:
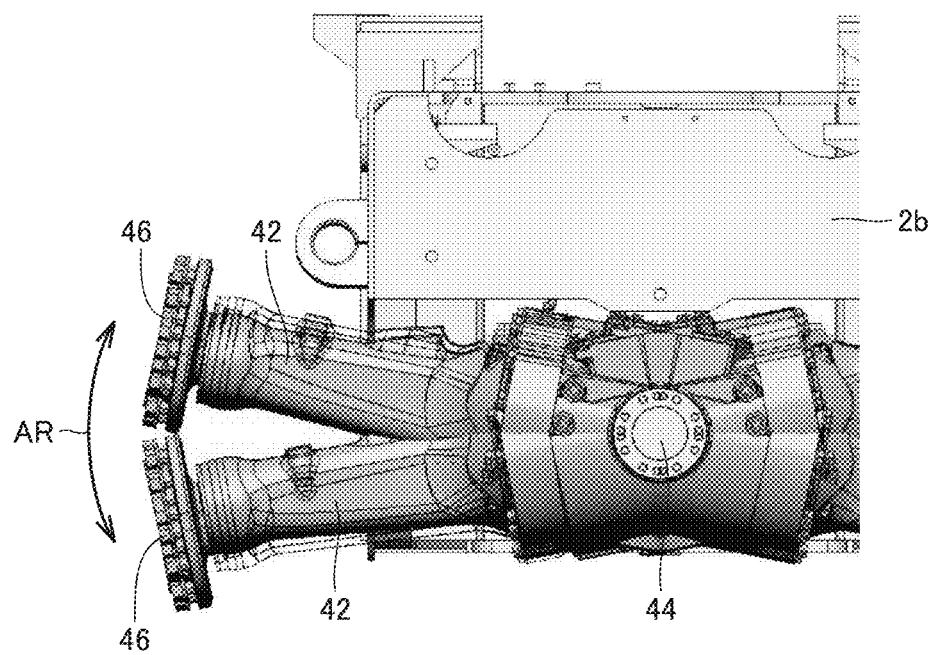
FIG. 4 is a diagram showing a roll motion of a rear axle with respect to a vehicular body.

Wheel loader 1 has a rear axle oscillation mechanism. FIG. 3 is a perspective view showing rear wheels 4b in an oscillatable state. FIG. 3 shows wheel loader 1 viewed from behind on the left side. FIG. 4 is a diagram showing a roll motion of rear axle 42 with respect to the vehicular body. FIG. 4 shows rear axle 42 viewed from behind.

The rear axle oscillation mechanism serves to keep the vehicular body horizontally when wheel loader 1 travels on an uneven road surface or a road surface inclined in the vehicle width direction. In wheel loader 1 having the rear axle oscillation mechanism, as shown in FIG. 4, rear axle 42 coupling the pair of rear wheels 4b to each other is supported by rear frame 2b so as to be swingable about coupling portion 44. As indicated by a double-headed arrow AR in FIG. 4, rear axle 42 is capable of undergoing a roll motion such that rear axle 42 is inclined in both directions with respect to the horizontal axis extending in the front-rear direction of the vehicular body, for example, the center of rotation of output shaft 23a or the center of rotation of rear propeller shaft 43. Coupling portion 44 (FIG. 2) is an example of a coupling device that supports rear axle 42 to be swingable about the horizontal axis such that rear axle 42 freely oscillates about the horizontal axis.

Rear wheel attachment portions 46 are provided at both the left and right end portions of rear axle 42. Left and right rear wheels 4b are attached to respective left and right rear wheel attachment portions 46. When rear axle 42 swings along the unevenness or the inclination of the road surface and inclines with respect to the vehicle width direction, rear wheels 4b move up and down integrally with rear axle 42 as indicated by double-headed arrow AR in FIG. 3. Thus, a total of four running wheels including one pair of left and right front wheels 4a and one pair of left and right rear wheels 4b can be brought into contact with the ground, and thereby, the driving force of wheel loader 1 can be reliably transmitted to the ground.

Referring back to FIG. 2, cylinder driving unit 24 includes work implement pump 25 and a control valve 26. The output from engine 20 is transmitted to work implement pump 25 through motive power extraction unit 22. The hydraulic oil discharged from work implement pump 25 is supplied to boom cylinder 16 and bucket cylinder 19 through control valve 26.

A sensor 33 detects the angle of a swash plate of work implement pump 25. Sensor 33 outputs a detection signal indicating the angle of the swash plate of work implement pump 25 to first processor 30. A pressure sensor 34 detects the pressure discharged from work implement pump 25. Pressure sensor 34 outputs a detection signal indicating the pressure discharged from work implement pump 25 to first processor 30.

First hydraulic pressure detectors 28a and 28b for detecting hydraulic pressure in an oil chamber of boom cylinder 16 are attached to boom cylinder 16. Wheel loader 1 includes first hydraulic pressure detectors 28a and 28b. First hydraulic pressure detectors 28a and 28b include a pressure sensor 28a for detecting head pressure, and a pressure sensor 28b for detecting bottom pressure, for example.

Pressure sensor 28a is attached to the head side of boom cylinder 16. Pressure sensor 28a can detect the pressure (head pressure) of the hydraulic oil in the cylinder-head-side oil chamber of boom cylinder 16. Pressure sensor 28a outputs a detection signal showing the head pressure of boom cylinder 16 to first processor 30. Pressure sensor 28b is attached to the bottom side of boom cylinder 16. Pressure sensor 28b can detect the pressure (bottom pressure) of the hydraulic oil in the cylinder-bottom-side oil chamber of boom cylinder 16. Pressure sensor 28b outputs a detection signal showing the bottom pressure of boom cylinder 16 to first processor 30.

First angle detector 29 is, for example, a potentiometer attached to boom pin 9. First angle detector 29 detects a boom angle showing a lift angle of boom 14. First angle detector 29 outputs a detection signal showing the boom angle to first processor 30.

Specifically, as shown in FIG. 1, a boom reference line A is a straight line passing through the center of boom pin 9 and the center of bucket pin 17. A boom angle $\theta1$ is an angle formed by a horizontal line H extending forward from the center of boom pin 9 and boom reference line A. When boom reference line A is horizontal, boom angle $\theta1=0°$. When boom reference line A is above horizontal line H, boom angle $\theta1$ is positive. When boom reference line A is below horizontal line H, boom angle $\theta1$ is negative.

First angle detector 29 may be a stroke sensor disposed in boom cylinder 16.

Second angle detector 48 is, for example, a potentiometer attached to support pin 18a. Second angle detector 48 detects a bucket angle indicating an angle of bucket 6 with respect to boom 14. Second angle detector 48 outputs a detection signal indicating the bucket angle to first processor 30.

Specifically, as shown in FIG. 1, a bucket reference line B is a straight line passing through the center of bucket pin 17 and a cutting edge 6a of bucket 6. A bucket angle θ2 is an angle formed by boom reference line A and bucket reference line B. When cutting edge 6a of bucket 6 extends horizontally on the ground in the state where bucket 6 is in contact with the ground, bucket angle θ2=0°. When bucket 6 is moved in a direction to be tilted (or upward), bucket angle θ2 is positive. When bucket 6 is moved in a direction for dumping (or downward), bucket angle θ2 is negative.

Second angle detector 48 may detect bucket angle θ2 by detecting an angle of bell crank 18 with respect to boom 14 (hereinafter referred to as a bell crank angle). The bell crank angle is formed by: a straight line passing through the center of support pin 18a and the center of coupling pin 18b; and boom reference line A. Second angle detector 48 may be a potentiometer or a proximity switch attached to bucket pin 17. Alternatively, second angle detector 48 may be a stroke sensor disposed on bucket cylinder 19.

IMU 66 outputs a detection signal to first processor 30, which indicates the angle of the inclination of the vehicular body of wheel loader 1 with respect to the vertical direction.

As shown in FIG. 2, wheel loader 1 includes an operation device 49 inside cab 5. Operation device 49 includes: an operation member 49a operated by an operator; and a detection sensor 49b that detects the position of operation member 49a and outputs the detection result to first processor 30. Operation device 49 is operated by the operator to give instructions to: switch the movement of the vehicle between forward movement and rearward movement; set the target rotational speed of engine 20; control the deceleration force of wheel loader 1; operate boom 14 to be raised and lowered; control a speed change from input shaft 21 to output shaft 23a in motive power transmission mechanism 23; cause bucket 6 to perform an excavation operation or a dumping operation; angle (articulate) front frame 2a relative to rear frame 2b via pivot mechanism 60; and the like.

First processor 30 is configured of a microcomputer including a storage device such as a random access memory (RAM) and a read only memory (ROM), and a computing device such as a central processing unit (CPU). First processor 30 may be implemented as a part of the function of the controller of wheel loader 1 that controls the operations of engine 20, work implement 3 (boom cylinder 16, bucket cylinder 19, and the like), motive power transmission mechanism 23, and the like.

First processor 30 receives inputs including mainly: a signal of the inclination angle of the vehicular body detected by IMU 66; a signal of boom angle θ1 detected by first angle detector 29; a signal of bucket angle θ2 detected by second angle detector 48; a signal of the head pressure of boom cylinder 16 detected by pressure sensor 28a; a signal of the bottom pressure of boom cylinder 16 detected by pressure sensor 28b; a signal of the articulation angle detected by articulation angle sensor 61; and a signal of the vehicle speed of wheel loader 1 detected by vehicle speed detection unit 27.

First processor 30 includes a storage unit 30j. Storage unit 30j stores a program for controlling various operations of wheel loader 1. First processor 30 performs various processes for controlling the operation of wheel loader 1 based on the program stored in storage unit 30j. Storage unit 30j is a non-volatile memory and provided as an area in which necessary data is stored.

<Oscillation Lock Mechanism 40>

Wheel loader 1 further includes an oscillation lock mechanism 40. In response to a control signal from first processor 30, oscillation lock mechanism 40 is driven to lock rear axle 42 so as not to move relative to the vehicular body, to thereby prevent a roll motion of rear axle 42 with respect to the vehicular body.

Figure 5:
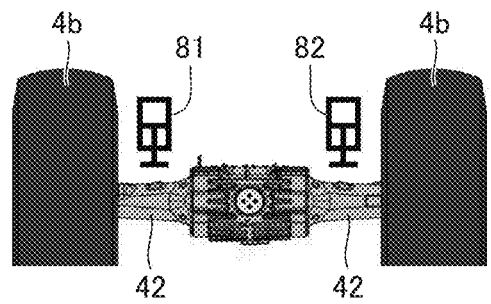
FIG. 5 is a schematic diagram showing a first example of an oscillation lock mechanism.

FIG. 5 is a schematic diagram showing the first example of oscillation lock mechanism 40. Oscillation lock mechanism 40 shown in FIG. 5 includes cylinders 81 and 82. Cylinder 81 is disposed to face a portion of rear axle 42 that is close to left rear wheel 4b with respect to coupling portion 44. Cylinder 82 is disposed to face a portion of rear axle 42 that is close to right rear wheel 4b with respect to coupling portion 44.

Figure 6:
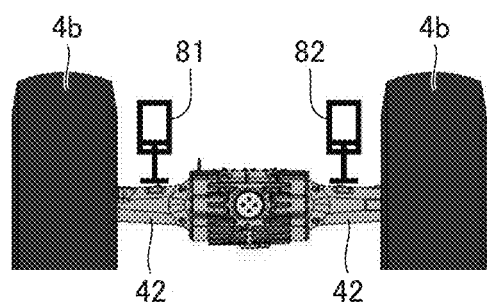
FIG. 6 is a schematic diagram showing the state where the oscillation lock mechanism shown in FIG. 5 is driven.

FIG. 6 is a schematic diagram showing the state where oscillation lock mechanism 40 shown in FIG. 5 is driven. In the state where oscillation lock mechanism 40 shown in FIG. 6 is driven, the piston rods of cylinders 81 and 82 protrude and the distal end portions of the piston rods come into contact with rear axle 42. The piston rods of cylinders 81 and 82 are pressed against rear axle 42 on both sides of coupling portion 44, to thereby prevent relative movement of rear axle 42 with respect to the vehicular body. In this way, rear axle 42 is locked to thereby prevent a roll motion of rear axle 42 with respect to the vehicular body.

Figure 7:
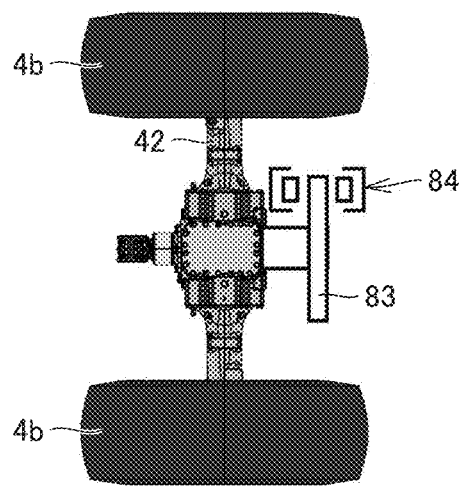
FIG. 7 is a schematic diagram showing a second example of the oscillation lock mechanism.

FIG. 7 is a schematic diagram showing the second example of oscillation lock mechanism 40. Oscillation lock mechanism 40 shown in FIG. 7 includes a brake disc 83 and a brake pad 84. Brake disc 83 is fixed to rear axle 42 and is rotatable integrally with rear axle 42 with respect to the vehicular body. Brake disc 83 has a flat plate shape. Brake pads 84 are disposed to sandwich plate-shaped brake disc 83 therebetween.

In the state where oscillation lock mechanism 40 shown in FIG. 7 is driven, brake pads 84 sandwich plate-shaped brake disc 83 from both sides to restrict the movement of brake disc 83. Since brake disc 83 is integrally fixed to rear axle 42, the relative movement of rear axle 42 with respect to the vehicular body is prevented. In this way, rear axle 42 is locked to thereby prevent a roll motion of rear axle 42 with respect to the vehicular body.

<Functional Blocks in First Processor 30>

First processor 30 shown in FIG. 2 has a function of locking the roll motion of rear axle 42 with respect to the vehicular body by driving oscillation lock mechanism 40. The functional blocks of first processor 30 having this function will be described below.

Figure 8:
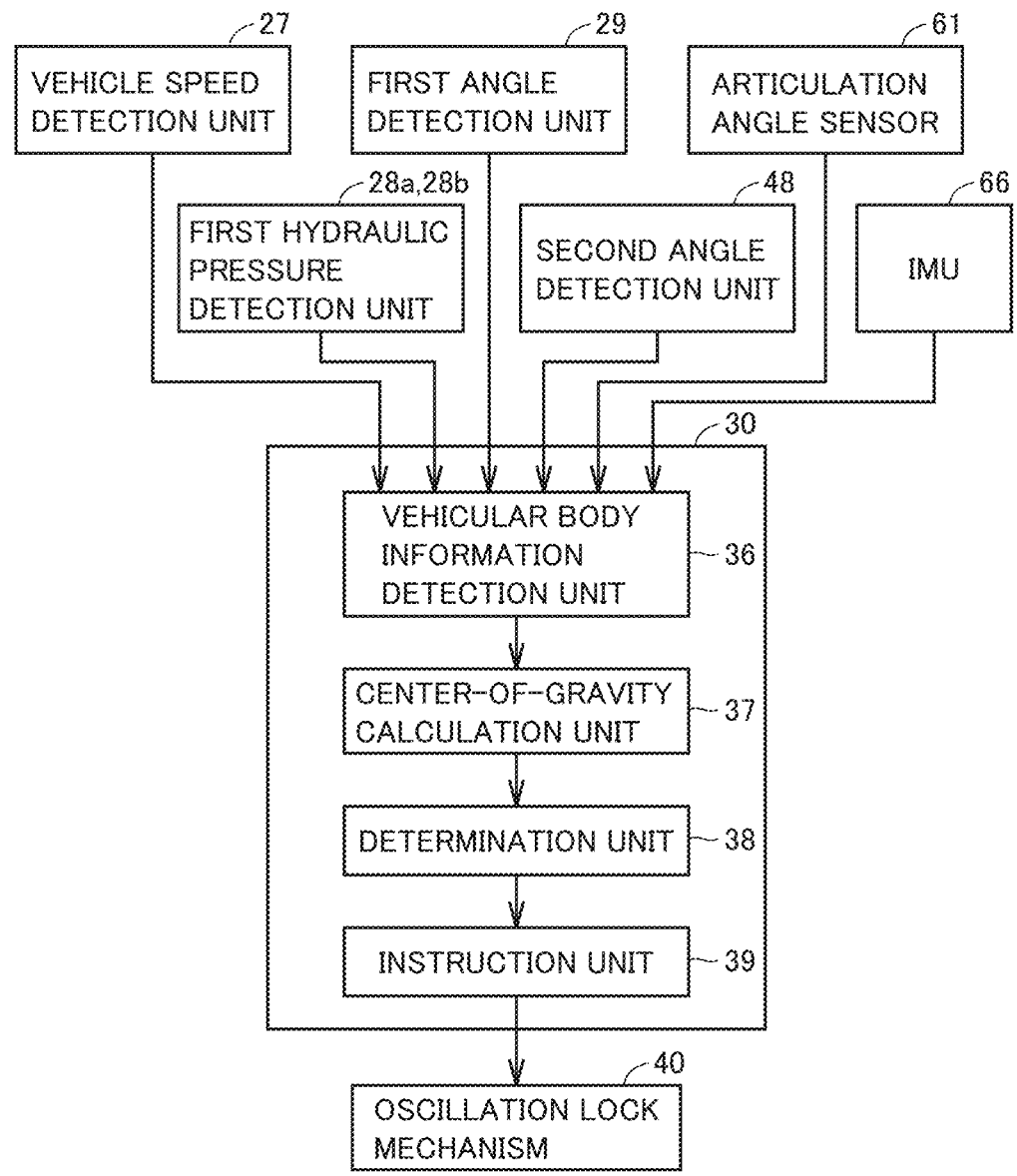
FIG. 8 is a diagram showing functional blocks in a first processor.

FIG. 8 is a diagram showing functional blocks in first processor 30. As shown in FIG. 8, first processor 30 includes, for example, a vehicular body information detection unit 36, a center-of-gravity calculation unit 37, a determination unit 38, and an instruction unit 39.

Vehicular body information detection unit 36 detects information about the vehicular body of wheel loader 1. Vehicular body information detection unit 36 acquires: a detection signal of the vehicle speed of wheel loader 1 that is output from vehicle speed detection unit 27; a detection signal of the hydraulic pressure in boom cylinder 16 that is output from each of first hydraulic pressure detectors 28a and 28b; a detection signal of boom angle θ1 that is output from first angle detector 29; a detection signal of bucket angle θ2 that is output from second angle detector 48; a detection signal of the articulation angle that is output from articulation angle sensor 61; and a detection signal of the inclination angle of the vehicular body that is output from IMU 66.

Boom angle θ1 and bucket angle θ2, the articulation angle, and the inclination angle of the vehicular body may be acquired by analyzing an image from a camera mounted on cab 5. Further, an IMU may be installed in work implement 3 to acquire boom angle θ1 and bucket angle θ2 based on the relativity between the result of detection by the IMU in work implement 3 and the result of detection by IMU 66 in the vehicular body.

Center-of-gravity calculation unit 37 calculates the position of the center of gravity of the vehicular body of wheel loader 1 based on the acquired vehicular body information. Center-of-gravity calculation unit 37 further acquires a vertical line that is a virtual straight line passing through the center of gravity of the vehicular body and extending in the vertical direction. Center-of-gravity calculation unit 37 outputs the acquired information about the vertical line to determination unit 38.

Determination unit 38 reads the information related to the specifications of the vehicular body of wheel loader 1 from storage unit 30j (FIG. 2). Specifically, from storage unit 30j, determination unit 38 reads: the center of rotation of left and right front wheels 4a; and the position of the center of the roll motion of rear axle 42 with respect to the vehicular body. Based on the information related to the specifications of the vehicular body of wheel loader 1 and the articulation angle, determination unit 38 derives a region defined from the center of rotation of left and right front wheels 4a and the position of the center of the roll motion of rear axle 42. Determination unit 38 determines the stability of wheel loader 1 based on the positional relation between the derived region and the vertical line acquired from center-of-gravity calculation unit 37. Based on the determined stability, determination unit 38 determines whether or not to lock the roll motion of rear axle 42. Determination unit 38 outputs the determination result to instruction unit 39.

When instruction unit 39 acquires the result of the determination to lock the roll motion of rear axle 42 from determination unit 38, it outputs a control signal for driving oscillation lock mechanism 40 to oscillation lock mechanism 40.

<Control Method for Locking Rear Axle 42>

Figure 9:
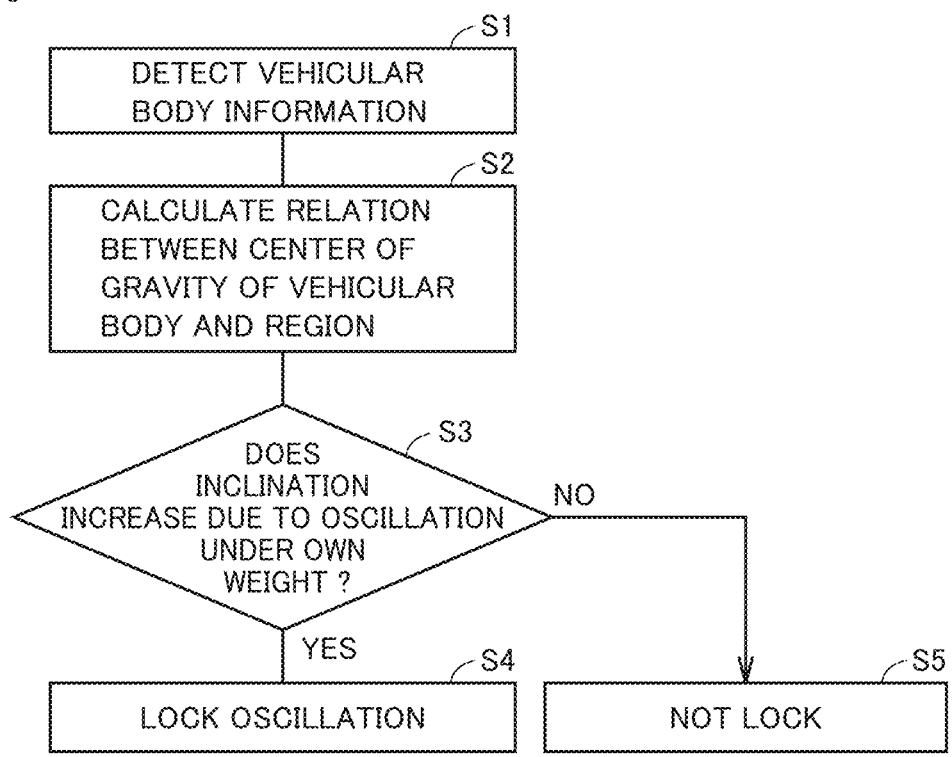
FIG. 9 is a flowchart showing a flow of a process of locking the roll motion of the rear axle.

The following describes a control method for locking rear axle 42. FIG. 9 is a flowchart showing a flow of a process of locking the roll motion of rear axle 42.

As shown in FIG. 9, in step S1, vehicular body information is first detected. First processor 30, specifically, vehicular body information detection unit 36, detects information about the vehicular body of wheel loader 1.

Figure 10:
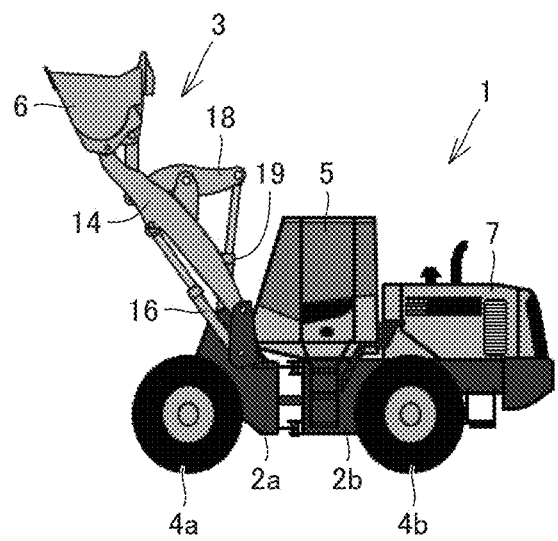
FIG. 10 is a side view of the wheel loader showing an example of vehicular body information.

FIG. 10 is a side view of wheel loader 1 showing an example of the vehicular body information. The vehicular body information includes the posture of work implement 3. In wheel loader 1 shown in FIG. 10, boom 14 is located higher than that in FIG. 1. Boom reference line A is located higher than horizontal line H in the posture shown in FIG. 10. In the posture shown in FIG. 10, boom angle θ1 has a positive value. In wheel loader 1 shown in FIG. 10, bucket 6 is moved in the dump direction as compared with FIG. 1. In the posture shown in FIG. 10, bucket angle θ2 has a negative value.

Vehicular body information detection unit 36 acquires a detection signal of boom angle θ1 from first angle detector 29. Vehicular body information detection unit 36 acquires a detection signal of bucket angle θ2 from second angle detector 48. The posture of work implement 3 is determined from boom angle θ1 and bucket angle θ2. The posture of work implement 3 influences the position of the center of gravity of the vehicular body of wheel loader 1. In the posture shown in FIG. 10 in which boom 14 is raised, the center of gravity of the vehicular body is located higher than that in the posture shown in FIG. 1.

Figure 11:
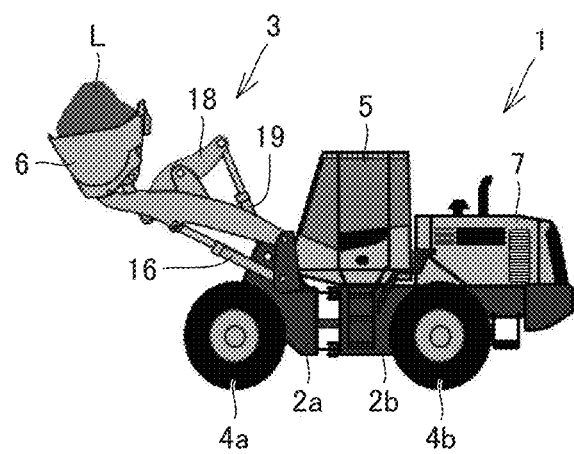
FIG. 11 is a side view of the wheel loader showing an example of the vehicular body information.

FIG. 11 is a side view of wheel loader 1 showing an example of the vehicular body information. The vehicular body information includes the state of a load L mounted on work implement 3. In the posture shown in FIG. 11, boom angle θ1 has a positive value while bucket angle θ2 has a negative value. In wheel loader 1 shown in FIG. 11, load L is mounted on bucket 6.

Vehicular body information detection unit 36 acquires a detection signal of boom angle θ1 from first angle detector 29. Vehicular body information detection unit 36 acquires a detection signal of bucket angle θ2 from second angle detector 48. From first hydraulic pressure detectors 28a and 28b, vehicular body information detection unit 36 acquires detection signals of the head pressure and the bottom pressure of boom cylinder 16. The weight of load L mounted on work implement 3 is determined from boom angle θ1, bucket angle θ2, and the head pressure and the bottom pressure of boom cylinder 16.

The weight of load L mounted on work implement 3 and the posture of work implement 3 on which load L is mounted influence the position of the center of gravity of the vehicular body of wheel loader 1. In the state where boom 14 is raised and load L is mounted on bucket 6 as shown in FIG. 11, the center of gravity of the vehicular body is located higher than that in FIG. 1.

Figure 12:
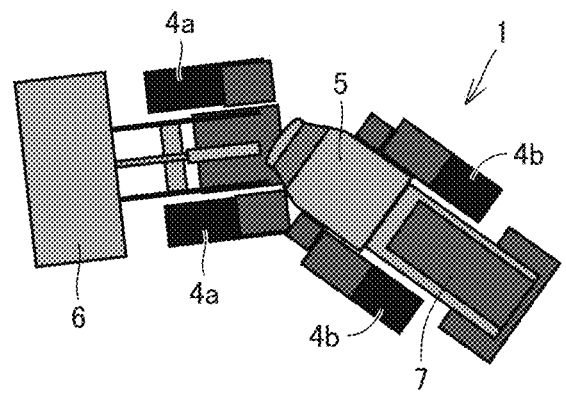
FIG. 12 is a plan view of the wheel loader showing an example of the vehicular body information.

FIG. 12 is a plan view of wheel loader 1 showing an example of the vehicular body information. The vehicular body information includes an articulation angle. In wheel loader 1 shown in FIG. 12, front frame 2a is angled with respect to rear frame 2b.

Vehicular body information detection unit 36 acquires a detection signal of the articulation angle from articulation angle sensor 61. The articulation angle influences the region defined by: the center of rotation of left and right front wheels 4a; and the position of the center of the roll motion of rear axle 42. In a plan view, this region has an isosceles triangle shape when wheel loader 1 travels straightforward, but has a scalene triangle shape when wheel loader 1 is in an angled posture as shown in FIG. 12. The articulation angle also influences the position of the center of gravity of the vehicular body of wheel loader 1.

Figure 13:
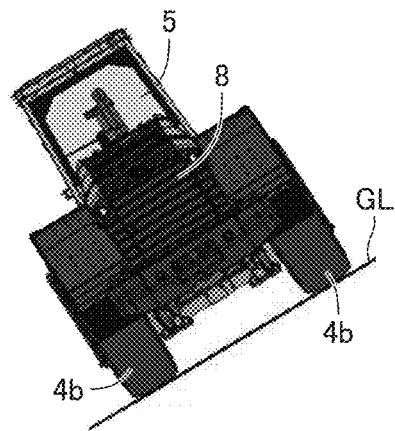
FIG. 13 is a rear view of the wheel loader showing an example of the vehicular body information.

FIG. 13 is a rear view of wheel loader 1 showing an example of the vehicular body information. The vehicular body information includes the inclination of the vehicular body of wheel loader 1 with respect to the vertical direction. A ground GL on which wheel loader 1 shown in FIG. 13 travels is inclined, so that the vehicular body of wheel loader 1 is inclined with respect to the vertical direction.

From IMU 66, vehicular body information detection unit 36 acquires a detection signal of the inclination angle of the vehicular body. The inclination angle of the vehicular body influences the inclination of the vertical line with respect to the top-bottom direction of the vehicular body. When wheel loader 1 is traveling on a flat road surface, the vertical line that is a virtual straight line passing through the center of gravity of the vehicular body of wheel loader 1 and extending in the vertical direction extends in the top-bottom direction of the vehicular body. When wheel loader 1 is traveling on an inclined surface as shown in FIG. 13, the vertical line extends in a direction inclined with respect to the top-bottom direction of the vehicular body.

Further, the vehicular body information includes the vehicle speed of wheel loader 1. Vehicular body information detection unit 36 acquires a detection signal of the vehicle speed from vehicle speed detection unit 27. In particular, when the vehicle travels on an inclined surface as shown in FIG. 13, the higher vehicle speed reduces the stability of the posture of wheel loader 1.

Referring back to FIG. 9, in step S2, first processor 30 then acquires the position of the center of gravity of the vehicular body of wheel loader 1 from the vehicular body information detected in previous step S1, and then, acquires a vertical line that is a virtual straight line passing through the center of gravity and extending in the vertical direction. First processor 30 further derives information related to the specifications of the vehicular body of wheel loader 1, specifically, a region defined by vertices as: the center of rotation of left and right front wheels 4a; and the position of the center of the roll motion of rear axle 42 with respect to the vehicular body. First processor 30 further calculates the positional relation between the derived region and the vertical line.

Then in step S3, first processor 30 determines the stability of wheel loader 1. Specifically, first processor 30 determines whether the inclination of the vehicular body in the vertical direction increases or not due to oscillation of wheel loader 1 under its own weight.

Figure 14:
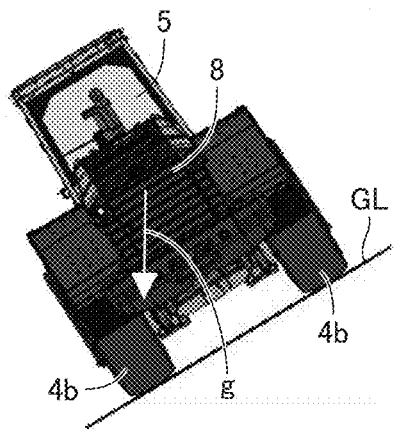
FIG. 14 is a diagram showing a vertical line of the wheel loader traveling on an inclined surface.

FIG. 14 is a diagram showing a vertical line of wheel loader 1 traveling on an inclined surface. FIG. 14 shows wheel loader 1 from behind as in FIG. 13. Ground GL on which wheel loader 1 travels is inclined laterally. A vertical line g shown in FIG. 14 extends in a direction inclined with respect to the direction orthogonal to ground GL. Vertical line g extends at an inclination with respect to the top-bottom direction of the vehicular body of wheel loader 1.

Figure 15:
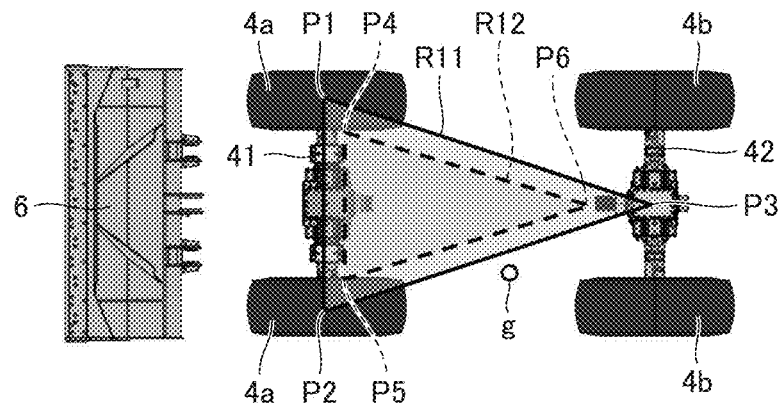
FIG. 15 is a diagram showing a positional relation between a region in an oscillatable state and the vertical line.

FIG. 15 is a diagram showing a positional relation between: regions R11, R12 in an oscillatable state; and vertical line g. Region R11 shown in FIG. 15 is defined by three vertices P1, P2, and P3. Vertex P1 is the center of rotation of right front wheel 4a. Vertex P1 indicates the center of a hub at the right end of front axle 41. Vertex P2 is the center of rotation of left front wheel 4a. Vertex P2 indicates the center of the hub at the left end of front axle 41. Vertex P3 indicates the position of the center of rear axle 42 in the left-right direction. Vertex P3 indicates the position of coupling portion 44 (FIG. 2) between rear propeller shaft 43 and rear axle 42. Vertex P3 indicates the position of the center of the roll motion of rear axle 42 with respect to the vehicular body.

FIG. 15 shows wheel loader 1 in a posture in which it travels straightforward, and region R11 has an isosceles triangle shape in this case. As described above, in the posture in which front frame 2a is angled (articulated) with respect to rear frame 2b, region R11 has a scalene triangle shape.

Since vertical line g is inclined with respect to the top-bottom direction of the vehicular body as shown in FIG. 14, vertical line g does not intersect with region R11 in the plane in which region R11 is defined. Vertical line g is located outside region R11. Since the vehicular body is inclined to the left, vertical line g is located outside region R11 on the left side.

When region R11 and vertical line g are in a positional relation in which vertical line g does not intersect with region R11, first processor 30, specifically, determination unit 38, determines that rear axle 42 undergoes a roll motion with respect to the vehicular body under the weight of the vehicular body, and as a result, the inclination of the vehicular body with respect to the vertical direction increases (YES in step S3). When the vehicular body relatively rotates under its own weight from the posture shown in FIG. 14 in the counterclockwise direction with respect to rear axle 42, the vehicular body is inclined more significantly with respect to ground GL. When the inclination of the vehicular body increases in this way, the posture of the vehicular body becomes unstable.

When it is determined that the stability of wheel loader 1 is low, the process proceeds to step S4, and the roll motion of rear axle 42 is locked. Instruction unit 39 of first processor 30 outputs a control signal for driving oscillation lock mechanism 40 to oscillation lock mechanism 40. Oscillation lock mechanism 40 having received the control signal is driven to thereby lock the roll motion of rear axle 42. As rear axle 42 cannot be relatively moved with respect to the vehicular body, the vehicular body is prevented from relatively rotating under its own weight with respect to rear axle 42.

Figure 16:
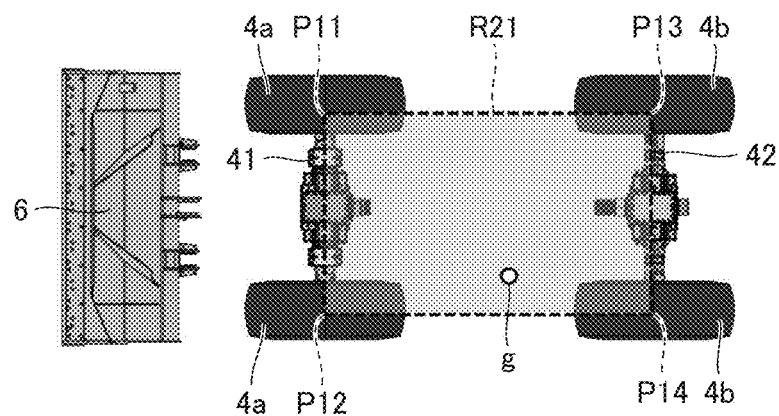
FIG. 16 is a diagram showing a positional relation between a region in an oscillation lock state and the vertical line.

FIG. 16 is the first diagram showing the positional relation between a region R21 in an oscillation lock state and vertical line g. When the roll motion of rear axle 42 is locked, region R21 shown in FIG. 16 is defined.

Region R21 is defined by four vertices P11, P12, P13, and P14. Vertex P11 is the center of rotation of right front wheel 4a. Vertex P11 indicates the center of a hub at the right end of front axle 41. Vertex P12 is the center of rotation of left front wheel 4a. Vertex P12 indicates the center of the hub at the left end of front axle 41. Vertex P13 is the center of rotation of right rear wheel 4b. Vertex P13 indicates the center of the hub (rear wheel attachment portion 46 in FIG. 4) at the right end of rear axle 42. Vertex P14 is the center of rotation of left rear wheel 4b. Vertex P14 indicates the center of the hub (rear wheel attachment portion 46 in FIG. 4) at the left end of rear axle 42. Region R21 has a rectangular shape.

As shown in FIG. 16, in the plane in which region R21 is defined, vertical line g intersects with region R21. Vertical line g is located inside region R21.

Figure 17:
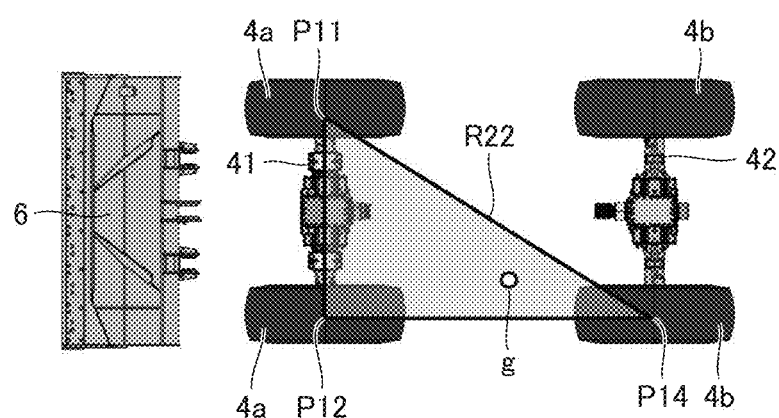
FIG. 17 is a diagram showing a positional relation between the region in the oscillation lock state and the vertical line.

FIG. 17 is the second diagram showing a positional relation between a region R22 in the oscillation lock state and vertical line g. FIG. 17 shows region R22 defined when left rear wheel 4b is in contact with the ground while right rear wheel 4b is not in contact with the ground. Note that region R11 described with reference to FIG. 16 is defined when both left and right rear wheels 4b are in contact with the ground.

Region R22 is defined by three vertices P11, P12, and P14. Region R22 has a right triangular shape. As shown in FIG. 17, in the plane in which region R22 is defined, vertical line g intersects with region R22. Vertical line g is located inside region R22.

Thus, vertical line g is to intersect with: rectangular region R21 defined by the four wheels of wheel loader 1; or right-angled triangular region R22 defined by the three wheels contacting the ground even if one of rear wheels 4b is away from the ground. This increases the stability of wheel loader 1, so that an increase in inclination of the vehicular body with respect to ground GL is suppressed, and thus, the posture of the vehicular body can be stabilized.

Referring back to FIG. 9, when it is determined in step S3 that the vehicular body is not inclined and rear axle 42 does not undergo a roll motion with respect to the vehicular body, or that the vehicular body is not so inclined as to increase the inclination of the vehicular body even if rear axle 42 undergoes a roll motion with respect to the vehicular body (NO in step S3), i.e., when it is determined that the stability of wheel loader 1 is sufficiently high, the process proceeds to step S5. In the process in step S5, instruction unit 39 does not output a control signal to oscillation lock mechanism 40, and the roll motion of rear axle 42 is not locked but remains in an oscillatable state. Then, the process ends.

As shown in FIG. 15, a region R12 indicated by a broken line is defined inside region R11 indicated by a solid line. Region R12 is defined by three vertices P4, P5, and P6. Vertices P4 and P5 are located rearward of front axle 41. Vertex P6 is located forward of rear axle 42. Vertex P4 is located more inside the vehicular body than vertex P1 is. Vertex P5 is located more inside the vehicular body than vertex P2 is. Vertex P6 is located more inside the vehicular body than vertex P3 is. Region R12 has an isosceles triangle shape similar to that of region R11. The isosceles triangle shape forming region R12 is shorter in base and height, and therefore, smaller in area than the isosceles triangle shape forming region R11.

When vertical line g does not intersect with region R11 and is located outside region R11, the inclination of the vehicular body with respect to the ground increases due to the weight of the vehicular body as described above. Region R12 can be set as a region for which sensor errors and the like are taken into consideration with respect to region R11. Region R11 is set based on the information related to the specifications of the vehicular body, and region R12 is set in consideration of an error with respect to region R11. Then, when it is determined that vertical line g does not intersect with region R12 and is located outside region R12, the roll motion of rear axle 42 can be locked. In this way, an increase in inclination of the vehicular body can be more reliably prevented.

<Functions and Effects>

The following summarizes characteristic configurations, and functions and effects about the work machine according to the above-described embodiment. Note that the constituent elements in the embodiment are denoted by reference characters, which are however provided merely by way of example.

As shown in FIG. 2, wheel loader 1 includes rear axle 42 and first processor 30. Rear axle 42 can undergo a roll motion with respect to an axis extending in the front-rear direction of a vehicular body. As shown in FIGS. 9 and 15, first processor 30 sets region R11 defined by: vertices P1 and P2 as the center of rotation of respective left and right front wheels 4a; and vertex P3 as the center of the roll motion of rear axle 42. First processor 30 sets vertical line g that is a virtual straight line passing through the center of gravity of the vehicular body and extending in the vertical direction. First processor 30 acquires the stability of the center of gravity of the vehicular body of wheel loader 1 from the positional relation between region R11 and vertical line g, and then, controls the roll motion of rear axle 42 with respect to the vehicular body based on the acquired stability.

When it is determined from the positional relation between region R11 and vertical line g that the inclination of the vehicular body of wheel loader 1 with respect to the ground surface increases, first processor 30 controls the roll motion of rear axle 42. Controlling the roll motion of rear axle 42 can suppress an increase in inclination of the vehicular body of wheel loader 1 with respect to the ground surface. Therefore, tipping over of wheel loader 1 including rear axle 42 capable of undergoing a roll motion with respect to the vehicular body can be prevented.

As shown in FIGS. 13 and 14, first processor 30 acquires vertical line g in consideration of the inclination of the vehicular body with respect to the vertical direction. By acquiring vertical line g in this way, it can be more accurately determined whether or not to control the roll motion of rear axle 42 based on the positional relation between region R11 and vertical line g.

As shown in FIGS. 10 and 11, first processor 30 acquires the position of the center of gravity of the vehicular body in consideration of the posture of work implement 3 and the state of load L mounted on work implement 3. By acquiring the position of the center of gravity in this way, it can be more accurately determined whether or not to control the roll motion of rear axle 42 based on the positional relation between region R11 and vertical line g.

As shown in FIG. 12, first processor 30 calculates region R11 from the angle formed by front frame 2a and rear frame 2b. By calculating region R11 in this way, it can be more accurately determined whether or not to control the roll motion of rear axle 42 based on the positional relation between region R11 and vertical line g. First processor 30 can acquire the position of the center of gravity of the vehicular body using the articulation angle and can calculate region R11 also using the articulation angle. Thus, it can be further more accurately determined whether or not to control the roll motion of rear axle 42 based on the positional relation between region R11 and vertical line g.

As shown in FIGS. 2 and 5 to 7, wheel loader 1 further includes oscillation lock mechanism 40 that locks the roll motion of rear axle 42. First processor 30 outputs a control signal for driving oscillation lock mechanism 40, to thereby allow easy control for locking the roll motion of rear axle 42.

As shown in FIG. 9, when first processor 30 determines that the inclination of the vehicular body with respect to the vertical direction increases as a result of the roll motion of rear axle 42 with respect to the vehicular body under the weight of the vehicular body, first processor 30 drives oscillation lock mechanism 40. Locking the roll motion of rear axle 42 can suppress an increase in inclination of the vehicular body of wheel loader 1 with respect to the ground surface, and thus, can prevent tipping over of wheel loader 1 including rear axle 42 capable of undergoing a roll motion with respect to the vehicular body.

As shown in FIG. 15, when vertical line g does not intersect with region R11, first processor 30 drives oscillation lock mechanism 40. Thereby, it can be more accurately determined whether or not to drive oscillation lock mechanism 40 based on the positional relation between vertical line g and region R11.

The embodiment has been described above with regard to a configuration including oscillation lock mechanism 40 that fixes rear axle 42, wherein, in the case where the inclination of the vehicular body with respect to the ground may possibly increase upon execution of a roll motion of rear axle 42 with respect to the vehicular body, rear axle 42 is locked to suppress an increase in inclination of the vehicular body. A mechanism having cylinders 81 and 82 shown in FIGS. 5 and 6 may be applied for rotationally driving rear axle 42. When wheel loader 1 travels on the terrain laterally inclined downward to the left as shown in FIG. 14, a control operation may be performed to drive cylinder 81 to press rear axle 42 by the piston rod thereof but not to drive cylinder 82. By rotationally driving rear axle 42 in the direction opposite to the direction in which the vehicular body rotates relative to rear axle 42 under its own weight, an increase in inclination of the vehicular body can be suppressed.

The embodiment has been described above with regard to an example in which region R11 in the oscillatable state is defined from: the center of rotation of left and right front wheels 4a; and the position of the center of the roll motion of rear axle 42 with respect to the vehicular body. The vertex defining region R11 in rear axle 42 is not limited to vertex P3 corresponding to the position of the center of the roll motion but may be set at any position in rear axle 42. For example, the vertices of region R11 may be set at both ends of rear axle 42. Alternatively, the vertex of region R11 may be set at one or both of left and right rear wheels 4b. Rear axle 42 extending in the left-right direction may form one side of region R11.

Further, the vertices defining region R11 in front axle 41 are not limited to left and right front wheels 4a, but may be set at any positions in front axle 41.

The embodiment has been described above with regard to wheel loader 1 as an example of the work machine. Without being limited to wheel loader 1, the concept of the embodiment may be applicable to any other work machine including rear wheels that can oscillate.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1 wheel loader, 2 vehicular body frame, 2a front frame, 2b rear frame, 3 work implement, 4 traveling unit, 4a front wheel, 4b rear wheel, 5 cab, 6 bucket, 14 boom, 20 engine, 27 vehicle speed detection unit, 28a, 28b first hydraulic pressure detector, 29 first angle detector, 30 first processor, 36 vehicular body information detection unit, 37 center-of-gravity calculation unit, 38 determination unit, 39 instruction unit, 40 oscillation lock mechanism, 41 front axle, 42 rear axle, 43 rear propeller shaft, 44 coupling portion, 46 rear wheel attachment portion, 48 second angle detector, 61 articulation angle sensor, 81, 82 cylinder, 83 brake disc, 84 brake pad, A boom reference line, AR double-headed arrow, B bucket reference line, GL ground, H horizontal line, L load, P1, P2, P3, P4, P5, P6, P11, P12, P13, P14 vertex, R11, R12, R21, R22 region, g vertical line.

The invention claimed is:

1. A work machine comprising:
   a vehicular body;
   a rear axle attached to the vehicular body to be capable of undergoing a roll motion with respect to an axis extending in a front-rear direction of the vehicular body;
   a rear frame that supports the rear axle;
   a front frame that is capable of being angled with respect to the rear frame;
   a front axle provided in a front portion of the vehicular body and including left and right front wheels;
   an articulation cylinder coupled between the front frame and the rear frame, wherein the front frame is pivoted with respect to the rear frame by extension and contraction of the articulation cylinder;
   an articulation angle sensor that detects an articulation angle formed by the front frame and the rear frame;
   a lock mechanism that locks the roll motion of the rear axle with respect to the vehicular body; and
   a controller that acquires stability of a center of gravity of the vehicular body and controls the roll motion of the rear axle with respect to the vehicular body based on the stability,
   wherein the controller determines whether to lock the roll motion of the rear axle with respect to the vehicular body based on the stability,
   wherein the controller outputs a control signal for driving the lock mechanism when the controller determines to lock the roll motion of the rear axle with respect to the vehicular body,
   wherein the stability is defined based on a relation between: a region defined by the front axle and the rear axle; and the center of gravity of the vehicular body, and
   wherein the controller derives the region from the detected articulation angle formed by the front frame and the rear frame.

2. The work machine according to claim 1, wherein the region is further defined by a position of a center of the roll motion of the rear axle.

3. The work machine according to claim 1, wherein the region is further defined by a center of rotation of the left and right front wheels.

4. The work machine according claim 1, wherein the stability is determined from a positional relation between the region and a vertical line that is a virtual straight line passing through the center of gravity of the vehicular body and extending in a vertical direction of gravity.

5. The work machine according to claim 4, wherein the controller acquires the vertical line in consideration of an inclination of the vehicular body with respect to the vertical direction.

6. The work machine according to claim 1, further comprising a work implement attached to the vehicular body, wherein the controller acquires a position of the center of gravity in consideration of a posture of the work implement and a state of a load mounted on the work implement.

7. The work machine according to claim 1, wherein the front frame supports the front axle.

8. The work machine according to claim 1, wherein the controller drives the lock mechanism when the controller determines that an inclination of the vehicular body with respect to a vertical direction of gravity increases as a result of the roll motion of the rear axle with respect to the vehicular body under a weight of the vehicular body.

9. The work machine according to claim 1, wherein
   the stability is defined based on: a region defined by the vehicular body and a sensor error; and a vertical line that is a virtual straight line passing through the center of gravity of the vehicular body and extending in a vertical direction of gravity, and
   the controller drives the lock mechanism when the vertical line does not intersect with the region.

* * * * *